United States Patent
Mejia et al.

(10) Patent No.: US 12,306,068 B2
(45) Date of Patent: May 20, 2025

(54) SYSTEMS AND METHODS FOR MONITORING A FLOW OF A FLUID ON AN EXTERNAL SURFACE OF A STRUCTURE IN MOTION

(71) Applicant: The Boeing Company, Chicago, IL (US)

(72) Inventors: Kevin M. Mejia, Sammamish, WA (US); Russell Westphal, Atascadero, CA (US); Andy Wu, San Ramon, CA (US); Zachary Deeds, Seattle, WA (US)

(73) Assignee: The Boeing Company, Arlington, VA (US)

( * ) Notice: Subject to any disclaimer, the term of this patent is extended or adjusted under 35 U.S.C. 154(b) by 262 days.

(21) Appl. No.: 18/063,840

(22) Filed: Dec. 9, 2022

(65) Prior Publication Data

US 2024/0192077 A1 Jun. 13, 2024

(51) Int. Cl.
*G01M 3/22* (2006.01)
*G01M 3/32* (2006.01)
(Continued)

(52) U.S. Cl.
CPC .......... *G01M 3/222* (2013.01); *G01M 3/3254* (2013.01); *G01M 9/067* (2013.01);
(Continued)

(58) Field of Classification Search
CPC .... G01M 3/222; G01M 3/3254; G01M 9/067; G01M 17/00; G01M 17/007;
(Continued)

(56) References Cited

U.S. PATENT DOCUMENTS

| 7,017,862 B1 | 3/2006 | Fischbach |
| 8,827,208 B2 | 9/2014 | Cammas et al. |

(Continued)

FOREIGN PATENT DOCUMENTS

| CN | 101424586 | 5/2009 |
| CN | 105547389 | 5/2016 |

(Continued)

OTHER PUBLICATIONS

Westphal et al: "Boundary Layer Data System (BLDS)," Final Project Report, Team AeroRAT (Dec. 3, 2009).
(Continued)

*Primary Examiner* — Laura Martin
*Assistant Examiner* — Anthony W Megna Fuentes
(74) *Attorney, Agent, or Firm* — Walters & Wasylyna LLC

(57) ABSTRACT

A system and method for monitoring a flow of a fluid on an external surface of a structure in motion. The structure defines an external side comprising the external surface and an internal side opposed from the external side. The system comprises a fluid dispensing device located on the internal side of the structure. The fluid dispensing device comprises the fluid and a conduit that directs the fluid onto the external surface of the structure. An observation device is located on the external side of the structure. The observation device is positioned to observe the flow of fluid on the external surface of the structure.

22 Claims, 7 Drawing Sheets

(51) Int. Cl.
 *G01M 9/06* (2006.01)
 *G01N 15/0227* (2024.01)
 *G01P 5/02* (2006.01)
 *G01N 15/00* (2024.01)

(52) U.S. Cl.
 CPC ............ *G01N 15/0227* (2013.01); *G01P 5/02* (2013.01); *G01N 2015/0026* (2013.01)

(58) Field of Classification Search
 CPC .......... G01M 17/08; G01M 3/04; G01M 3/18; G01M 3/182; G01M 3/38; G01M 9/065; G01M 9/02; G01M 9/00; G01M 9/08; G01N 15/0227; G01N 2015/0026; G01N 33/18; G01N 33/1873; G01N 33/22; G01P 5/02; G01D 21/02; G01D 21/00
 See application file for complete search history.

(56) References Cited

U.S. PATENT DOCUMENTS

| | | |
|---|---|---|
| 10,359,337 B1 | 7/2019 | Bissel et al. |
| 11,300,472 B2 | 4/2022 | Platel et al. |
| 2013/0118234 A1 | 5/2013 | Jeon |
| 2016/0258843 A1* | 9/2016 | Tanaka .................... G09B 25/00 |
| 2017/0036709 A1 | 2/2017 | Metka et al. |
| 2018/0079533 A1* | 3/2018 | Suchezky .............. B64U 20/87 |
| 2019/0168221 A1* | 6/2019 | Sollier .............. B01L 3/502738 |
| 2021/0112235 A1 | 4/2021 | Axinte et al. |
| 2022/0075378 A1 | 3/2022 | Hewitt et al. |

FOREIGN PATENT DOCUMENTS

| | | | | |
|---|---|---|---|---|
| CN | 110552828 | | 12/2019 | |
| GB | 2452488 A | * | 3/2009 | ............. B64C 15/00 |

OTHER PUBLICATIONS

Vicroy et al: "Low-speed Aerodynamic Investigations of a Hybrid Wing Body Configuration," NTRS-NASA Technical Reports Server, No. NF1676L-17767 (Jun. 16, 2014). https://ntrs.nasa.gov/citations/20150000554.

G.S. Settles: "Aerospace and Wind Tunnel Testing," Handbook of Flow Visualization, Routledge, pp. 395-407 (2018). https://www.taylorfrancis.com/chapters/edit/10.1201/9780203752876-25/aerospace-wind-tunnel-testing-settles.

Mejia et al: "Boeing-Cal Poly Engineering Collaboration Flies High," (May 20, 2021).

Russ Westphal: "Otto Aviation Uses Cal Poly Boundary Layer Data System in Flight Test of New Aircraft," (Oct. 21, 2021).

* cited by examiner

SYSTEMS AND METHODS FOR MONITORING A FLOW OF A FLUID ON AN EXTERNAL SURFACE OF A STRUCTURE IN MOTION

FIELD

The present disclosure generally relates to monitoring a flow of a fluid. In particular, the present disclosure relates to a system and method for dispensing the fluid onto a surface and observing the flow of the fluid on the surface.

BACKGROUND

Many tests are performed during the process of aircraft certification. Some of these tests are performed under actual flight conditions. One such test is performed to determine if a fluid leaking from within the aircraft may escape externally. The test may be to determine if jet engine fluids, such as fuel, lubricating oil, hydraulic fluid, or other fluids from within a fan cowl or other parts of the nacelle or aircraft may leak externally and collect in the cowl or other parts of the nacelle or aircraft. Any such leak may raise a concern and/or may be considered detrimental to the performance of the aircraft.

To determine if any leak from within the aircraft occurs, it is desirable to examine the flow of a fluid on an external surface of the aircraft. For example, it may be desirable to witness a flow of a fluid on an external surface of the aircraft, during actual flight conditions. If the aircraft is operating at relatively high speeds and at relatively high altitudes the structure is typically subject to relatively low temperatures (e.g., −40° F. to −70° F. at 30,000 feet). At these speeds and at these temperatures the fluid and the flow on the external surface of the structure may be adversely affected. The fluid may thicken and be difficult to introduce onto the surface of the structure and may not flow on the surface in a manner that would provide meaningful results. Also, observing remnants of in-flight flows upon the aircraft's return may lead to incorrect conclusions about the flow field.

There were prior attempts at studying fluid flow from or on a surface in motion, or simulated motion. One such prior attempt was to study wake vortexes of an aircraft by generating smoke. The smoke is generated by introducing a liquid into a hot gas flow from a jet engine. The smoke then is exhausted externally of an airfoil. The pattern of smoke flow is then visually observed. Another prior attempt at studying air flow over an automobile in a wind tunnel involves oil, such as olive oil or mineral oil. The oil is atomized. The atomized oil is introduced into a relatively low speed air flow generated by the wind tunnel. The flow of the atomized oil may then be observed. Fluid flow may also be observed on a surface in motion through the use of separate means such as chase vehicles. These vehicles operate alongside the surface of interest separately, recording the fluid flow as it occurs. Along with being expensive to operate, chase vehicles present challenging safety concerns, requiring separate vehicles to operate in close proximity to one another, often limiting the quality of the recording of fluid flow.

Thus, a need exists for a system and/or method for monitoring a flow of a fluid on a surface of a structure in motion especially when the structure and fluid experience relatively low temperatures, relatively high speeds, or relatively high altitudes. A further need is to be able to safely and cheaply observe the flow of the fluid on the surface remotely and in real time without affecting aerodynamic characteristics of the structure. Known prior attempts fail to address such needs.

SUMMARY

Disclosed are systems for monitoring a flow of a fluid on an external surface of a structure in motion, the structure defining an external side including the external surface and an internal side opposed from the external side.

In one example, the disclosed system includes a fluid dispensing device located on the internal side of the structure, the fluid dispensing device includes the fluid and a conduit that directs the fluid onto the external surface of the structure; and an observation device located on the external side of the structure, the observation device being positioned to observe the flow of fluid on the external surface of the structure.

In another example, the disclosed system includes a fluid dispensing device located on the internal side of the structure, the fluid dispensing device including a conduit, a reservoir containing a quantity of the fluid, and a pump configured to draw the fluid from the reservoir and direct the fluid through the conduit and onto the external surface of the structure; and a camera located on the external side of the structure, the camera being positioned to observe a flow of the fluid on the external surface of the structure.

Also disclosed are methods for monitoring a flow of a fluid on an external surface of a structure in motion, the structure defining an external side including the external surface and an internal side opposed from the external side.

In one example, the disclosed method includes (1) dispensing the fluid from a location on the internal side of the structure to establish the flow of the fluid on the external surface of the structure; and (2) observing the flow of the fluid along the external surface of the structure with an observation device located on the external side of the structure.

Other examples of the disclosed systems and methods for monitoring a flow of a fluid on an external surface of a structure in motion will become apparent from the following detailed description, the accompanying drawings and the appended claims.

DETAILED DESCRIPTION

Figure 1:
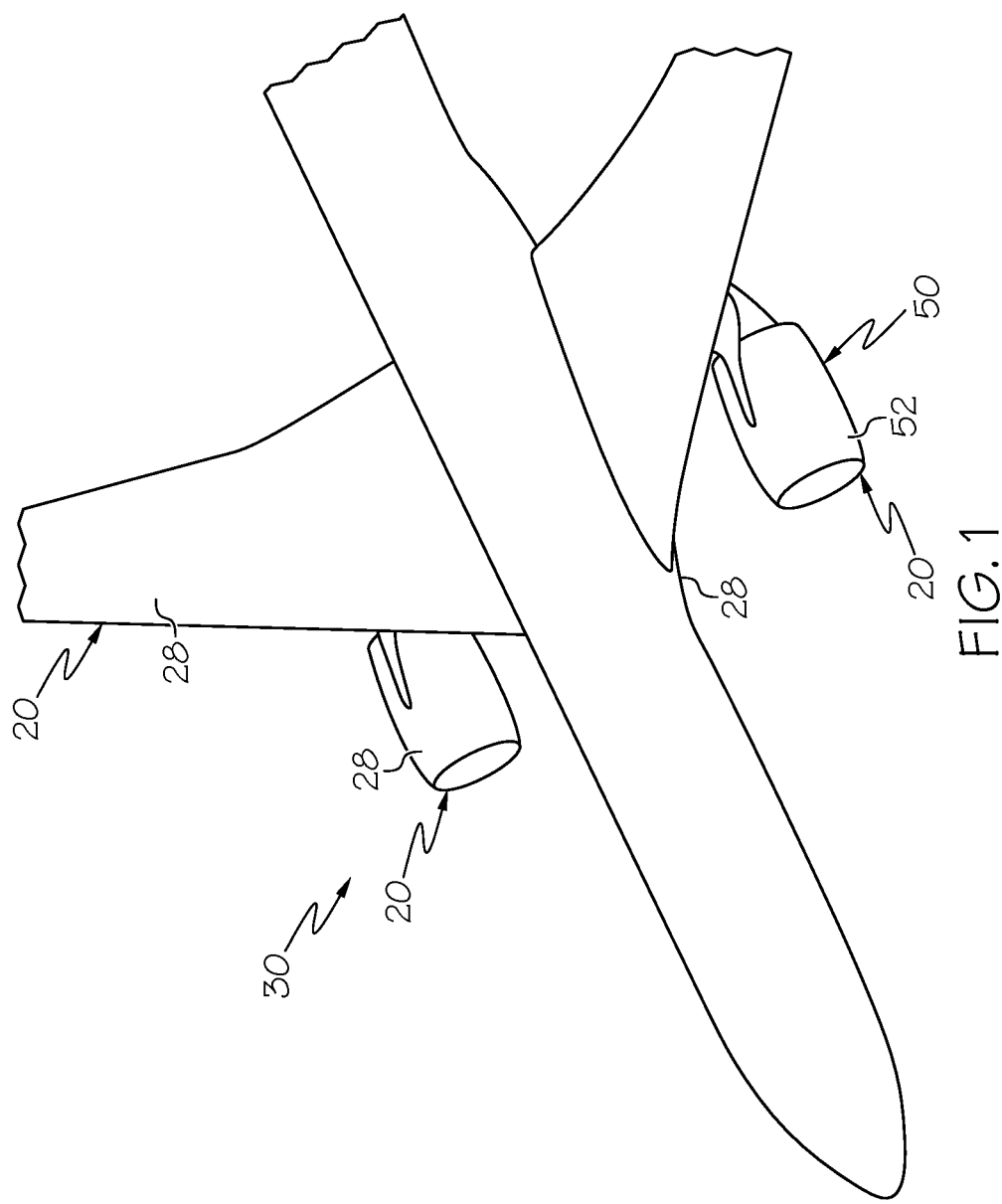
FIG. 1 is a partial perspective view of an aircraft.

The disadvantages and shortcomings of the known prior attempts are overcome by the disclosed systems and methods for monitoring a flow of a fluid on an external surface of a structure in motion.

The disclosed systems and methods dispense a liquid fluid, such as oil, onto a surface in motion at relatively low temperatures. The flow of the liquid fluid on the surface in motion, such as a component of an aircraft, may be observed remotely in real time and during actual flight conditions. The system is quick to install, is self-contained and independent of all aircraft systems. The system is particularly suitable for use in certifying aircraft.

The disclosed systems may feature a modular fluid dispensing device that can temporarily attach to an internal surface of a structure, such as an aircraft. The fluid dispensing device dispenses a liquid fluid, such as oil to simulate a leak within the structure, onto an external aerodynamic surface of the structure during certain predetermined flight conditions or time in flight. A camera is positioned on the external aerodynamic surface to view the flow of oil during actual flight conditions remotely and in real time. The camera is mounted on the external aerodynamic surface and may be positioned for an optimal remote view of the flow of oil on the external aerodynamic surface.

The structure may be an aircraft during actual flight conditions. The structure may have an external side including the external surface. The structure may also have an internal side opposed from the external side. The disclosed systems include a fluid dispensing device located on the internal side of the structure. The fluid dispensing device includes the fluid and a conduit that directs the fluid onto the external surface of the structure. An observation device is located on the external side of the structure. The observation device is positioned to observe the flow of fluid on the external surface of the structure.

The structure has an outlet. The conduit may direct the fluid from the fluid dispensing device through the outlet and onto the external surface of the structure. The observation device is mounted on the external surface of the structure. The observation device may be a camera. The camera may be a digital camera. A second observation device may be located on the internal side of the structure to monitor any ingestion of the fluid.

The fluid is a liquid fluid. The fluid may be at least one of an oil-based fluid and a glycol-based fluid. The fluid may have a viscosity property so the liquid fluid is capable of flowing at low temperatures from high altitude and high-speed motion of the structure. As one example, the liquid fluid may be capable of flowing at temperatures below 0° F. As another example, the liquid fluid may be capable of flowing at temperatures below −10° F. As another example, the liquid fluid may be capable of flowing at temperatures below −20° F. As another example, the liquid fluid may be capable of flowing at temperatures below −30° F. As another example, the liquid fluid may be capable of flowing at temperatures below −40° F. As another example, the liquid fluid may be capable of flowing at temperatures below −50° F. As another example, the liquid fluid may be capable of flowing at temperatures below −60° F. As yet another example, the liquid fluid may be capable of flowing at temperatures as low as −69.7° F.

A computer may be in communication with the observation device and/or the fluid dispensing device to remotely observe and record the flow of fluid on the external surface of the structure. At least one of the communications between the computer and the observation device, and communication between the computer and the fluid dispensing device, may be wireless.

The structure may be a component of an aircraft. The component may be an engine nacelle. The conduit may direct the fluid from proximate (at or near) a lowermost portion of the component onto the external surface of the component of the structure or any other region of interest on the external surface.

The fluid dispensing device is mounted on the internal side of the structure. The fluid dispensing device includes a reservoir, and the fluid is received in the reservoir. The fluid dispensing device may further include a pump. The pump draws the fluid from the reservoir and directs the fluid through the conduit. A control device is in communication with the pump for controlling a flow rate of the fluid flowing to the conduit and onto the external surface of the structure.

Disclosed are systems for monitoring a flow of a fluid on an external surface of a structure in motion and method of using the system are disclosed. The disclosed systems may dispense a liquid fluid, such as oil, that is used for observing the flow of the liquid fluid on external surfaces of a structure, such as an aircraft during flight. The disclosed systems may be quick to install, may allow remote in-flight observation of fluid flow on an aircraft external surface in real time, may be self-contained and independent of all aircraft systems. The disclosed systems may be used for certifying the aircraft.

The disclosed systems may include a modular fluid dispensing device that may temporarily or permanently attach to an internal aerodynamic surface. The fluid dispensing device may dispense an oil onto the external aerodynamic surface during certain flight conditions. A camera may be positioned on the external aerodynamic surface to view the flow of oil during actual flight conditions. The camera may be supported by an aerodynamic support and may be positioned for an optimal view of the flow of oil on the aerodynamic surface.

Figure 3:
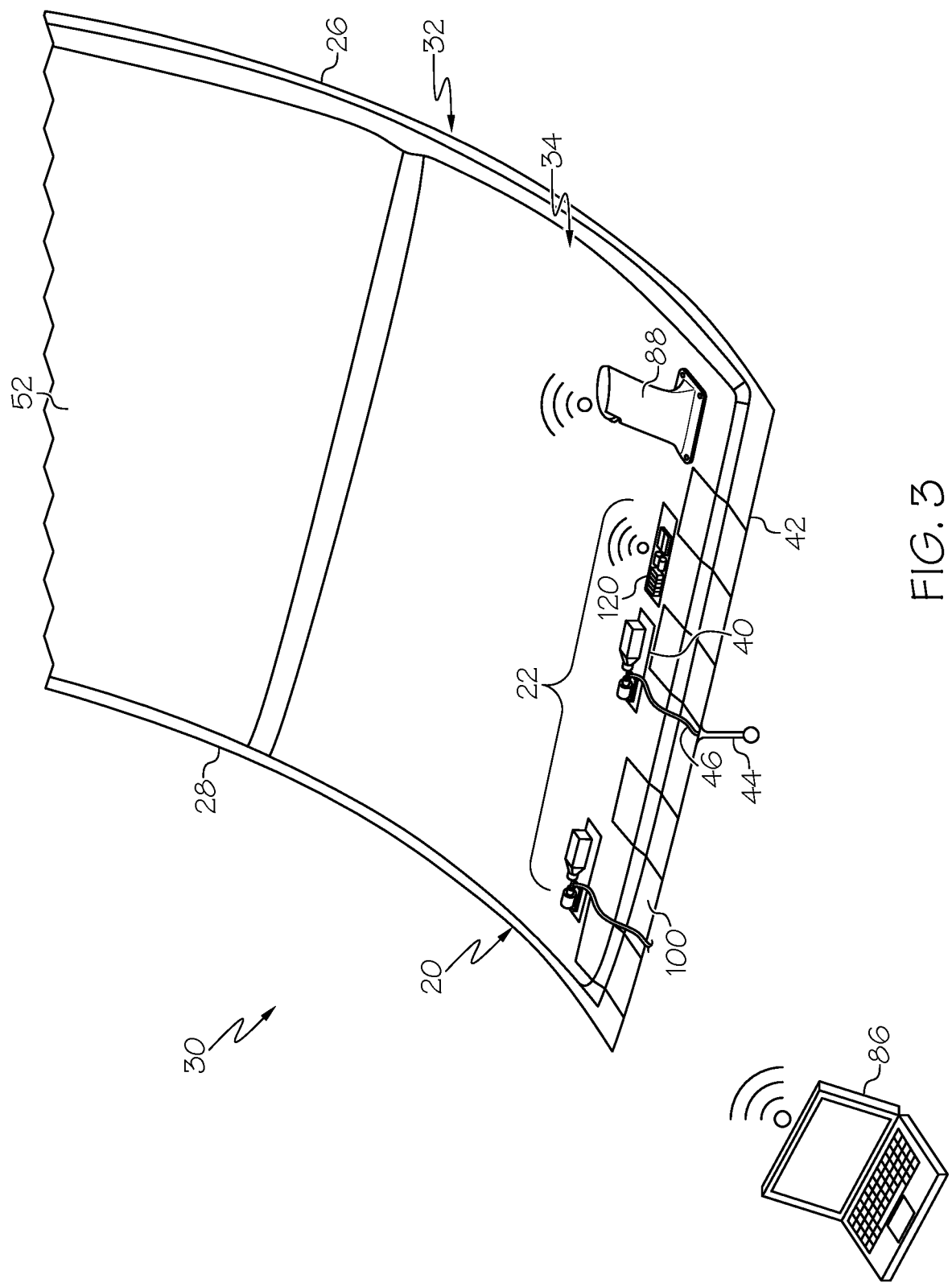
FIG. 3 is a partial perspective view from inside of the cowl illustrating a system for dispensing and monitoring a flow of a fluid.
Figure 5:
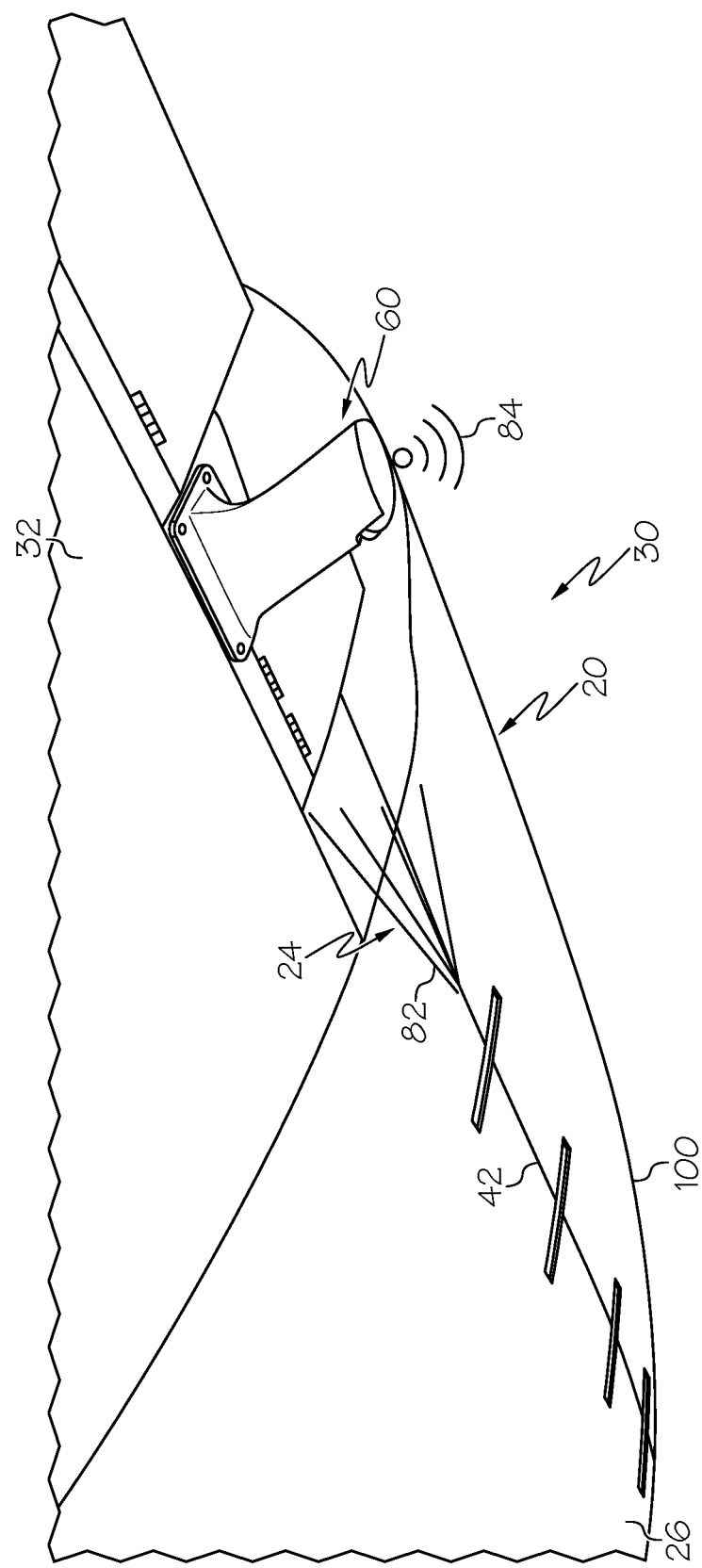
FIG. 5 is a perspective view from below of a portion of the jet engine nacelle and cowl illustrating a camera attached to the external surface of the nacelle.

Referring to FIGS. 3 and 5, shown is one example of the disclosed system, generally designated 22 (FIG. 3), for monitoring a flow 24 (FIG. 5) of a fluid 44 on an external surface 26 of a structure 20 that is in motion. The structure 20 has an external side 32. The external side 32 includes the external surface 26. The structure 20 also has an internal side 34 that is opposite from the external side 32.

Figure 2:
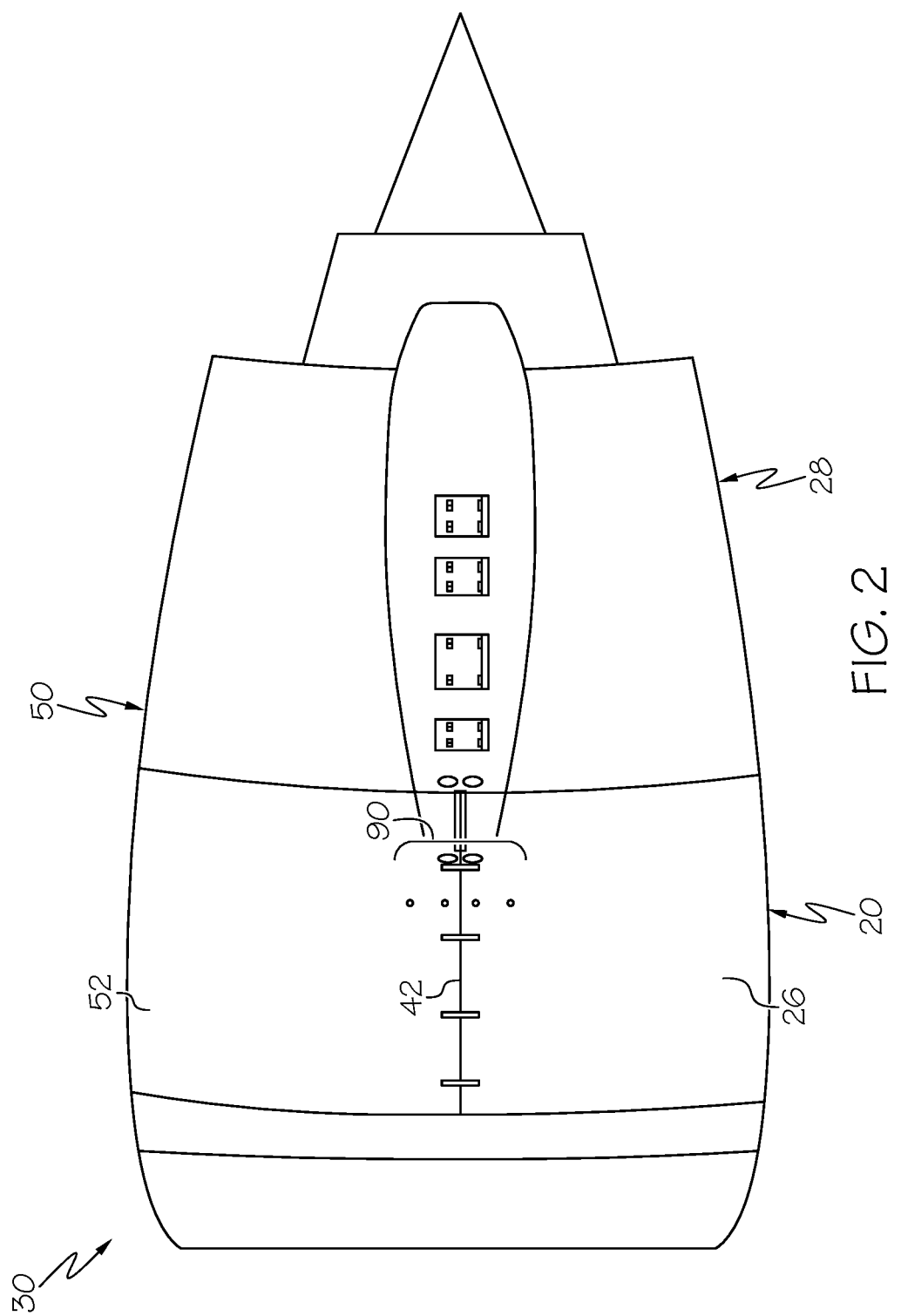
FIG. 2 is a plan view from below the aircraft of a jet engine nacelle and cowl.

The structure 20 may be in the form of a component 28 (FIG. 1) of an aircraft 30. By way of example, the component 28 of the structure 20 may be an aircraft jet engine that includes a nacelle 50 (FIG. 2) and a cowl 52. The external surface 26 of the component 28 onto which the flow 24 of fluid 44 is dispensed may be a nacelle 50 or cowl 52 for a jet engine. The component 28 may also be an airfoil, fuselage, or empennage of the aircraft 30.

The system 22 includes a fluid dispensing device 40 (FIGS. 3-4) mounted to an internal surface 100 of the internal side 34 of the structure 20. The fluid dispensing device 40 may be attached to the internal surface 100 of the structure 20, such as a temporary fixture. However, the fluid dispensing device 40 may be permanently attached to the internal surface 100 of the structure 20, if so desired for example during certification of the aircraft 30. The fluid dispensing device 40 receives and stores the fluid 44. The fluid dispensing device 40 includes a conduit 46 that directs the fluid 44 onto the external surface 26 of the structure 20 through an outlet 42. The conduit 46 directs the fluid 44 onto the external surface 26 of the component 28 proximate a lowermost portion of the cowl 52 where any leak of fluid may collect. The conduit 46 may direct the fluid 44 onto the external surface 26 of the component 28 from any location within the nacelle 50 or the cowl 52 where a fluid leak may occur.

The structure 20 may have any number of outlets 42 of various sizes and shapes. For example, the outlet 42 in the structure 20 may be in the form of a space located between retractable halves of a cowl 52 for a jet engine. The outlet 42 may consist of more than one opening and may be located anywhere in the structure 20 such as the nacelle 50 or cowl 52 or a series of drain holes in the nacelle or cowl. The outlet 42 may be located proximate the lowermost portion of the structure 20. The conduit 46 directs the fluid 44 through the outlet 42 and then onto the external surface 26 of the structure 20.

Figure 6:
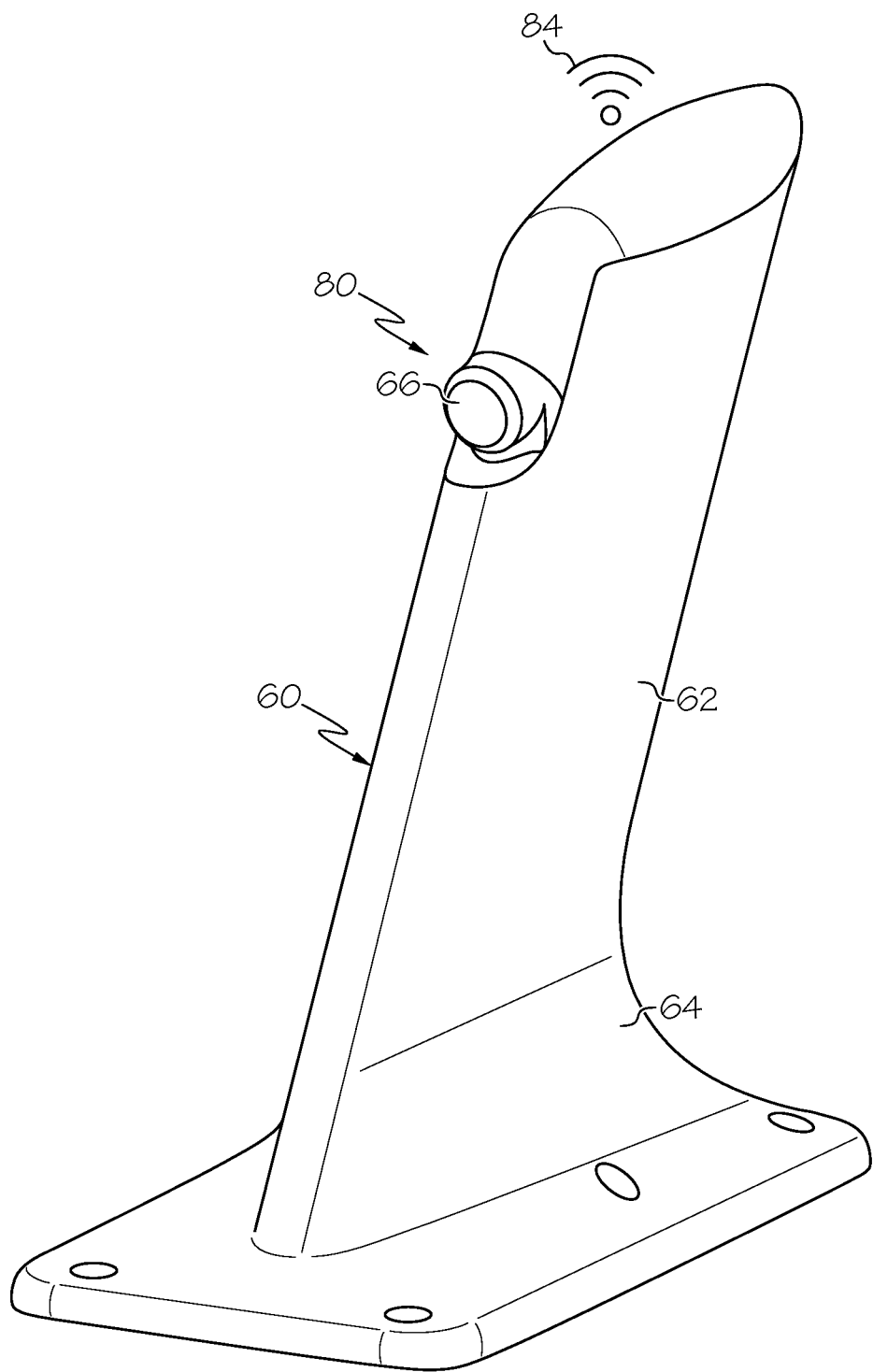
FIG. 6 is an enlarged perspective view of the camera illustrated in FIG. 5.

An observation device 60 (FIGS. 5-6) is mounted on the external surface 26 of the external side 32 of the structure 20. The observation device 60 may be attached to the external surface 26, such as a temporary fixture. A temporary mount may be used, for example, for the purpose of certifying the aircraft 30, though other uses are also contemplated, such as for research and development efforts on a technology flight or for troubleshooting during flights prior to official certification flights. However, the observation device 60 may be permanently (or semi-permanently) attached to the external surface 26 of the structure 20. The observation device 60 is positioned to observe the flow (24) of fluid 44 on the external surface 26 of the external side 32 of the structure 20 in an area 90 (FIG. 2) of interest.

The observation device 60 may be in the form of a camera 80. The camera 80 may be a digital camera. The observation device 60 supports the camera in a body 62 extending from a base 64. The base 64 may be attached to the external surface 26 of the structure 20 temporarily or permanently. The body 62 and base 64 form an aerodynamic support that will not disturb or affect the normal operation of the structure 20 in motion. The observation device 60 may be located transversely from a longitudinally extending pattern 82 of the flow 24 of the fluid 44 so the observation device does not disrupt or affect the flow 24 of fluid 44 along the external surface 26. The offset location of the observation device 60 from the pattern 82 of the flow 24 of the fluid 44 minimizes the chance that the fluid may foul a lens on the camera 80. The camera 80 may have a hydrophobic coating on its lens that may serve as a self-cleaning feature. The observation device 60 may have a clear shield 66, which optionally may be coated with a hydrophobic coating.

Another camera 88 (FIG. 3) may be mounted to an internal surface 100 of the internal side 34 of the structure 20 to observe a leak where fluid may collect inside the structure 20 and does not flow to the external surface 26 of the structure 20. The other camera 88 may also be used to observe any fluid from the external surface 26 that may flow onto the internal surface 100 through the opening defining the outlet 42 or drain holes in the cowl 52. The other camera 88 may be of identical structure as the camera 80. The other camera 88 may be of a different design and configuration from the structure of the camera 80 since the other camera 88 will not necessarily be exposed to the same relatively harsh operating conditions as the externally mounted camera 80.

The fluid 44 may be a liquid fluid. The fluid 44 may be any suitable liquid fluid that is able to flow in a visible pattern along the external surface 26 of the structure 20 during motion of the structure at relatively high altitude and relatively high speed. The relatively high altitude and relatively high-speed subjects the fluid 44 to relatively low temperatures that could affect performance of the fluid 44. In certain examples, the fluid 44 may be an oil-based liquid fluid or a glycol-based liquid fluid. The fluid 44 may include a dye or other suitable additive to make the flow 24 of the fluid 44 more visible or enable a desired flow of the liquid fluid. The fluid 44 may have a viscosity property such that the fluid 44 is capable of flowing to yield desirable results at relatively low temperatures from the high altitude and the high-speed motion of the structure 20. the fluid 44 is capable of flowing at low temperatures from motion of the structure 20 at high altitude. It is desirable for the fluid 44 to flow and cling to the external surface 26 under all conditions. It is also desirable to recognize if the fluid 44 separates from the external surface 26.

The system 22 may have communication devices that permit real time observation and the ability to record what is observed. A computer 86 (FIG. 3) is in communication with the observation device 60 and the fluid dispensing device 40. The communication between the computer 86 and the observation device 60 may be hardwired or wireless 84 or any other suitable communication means. Also, the camera 88 on the internal surface 100 may be in communication either wirelessly or hardwired or any other suitable communication means to the computer 86. At least one of the communications between the computer 86 and the observation device 60 and the communication between the computer 86 and the fluid dispensing device 40 may be wireless. The computer 86 may be in wireless communication with the camera of the observation device 60. The control device 120 may also be in wireless communication with the fluid dispensing device 40. The communication between the computer 86 and camera 88 on the internal surface 100 may also be wireless. The camera 80 may run autonomously and asynchronously to gather data from the observation device 60 for later processing.

Figure 4:
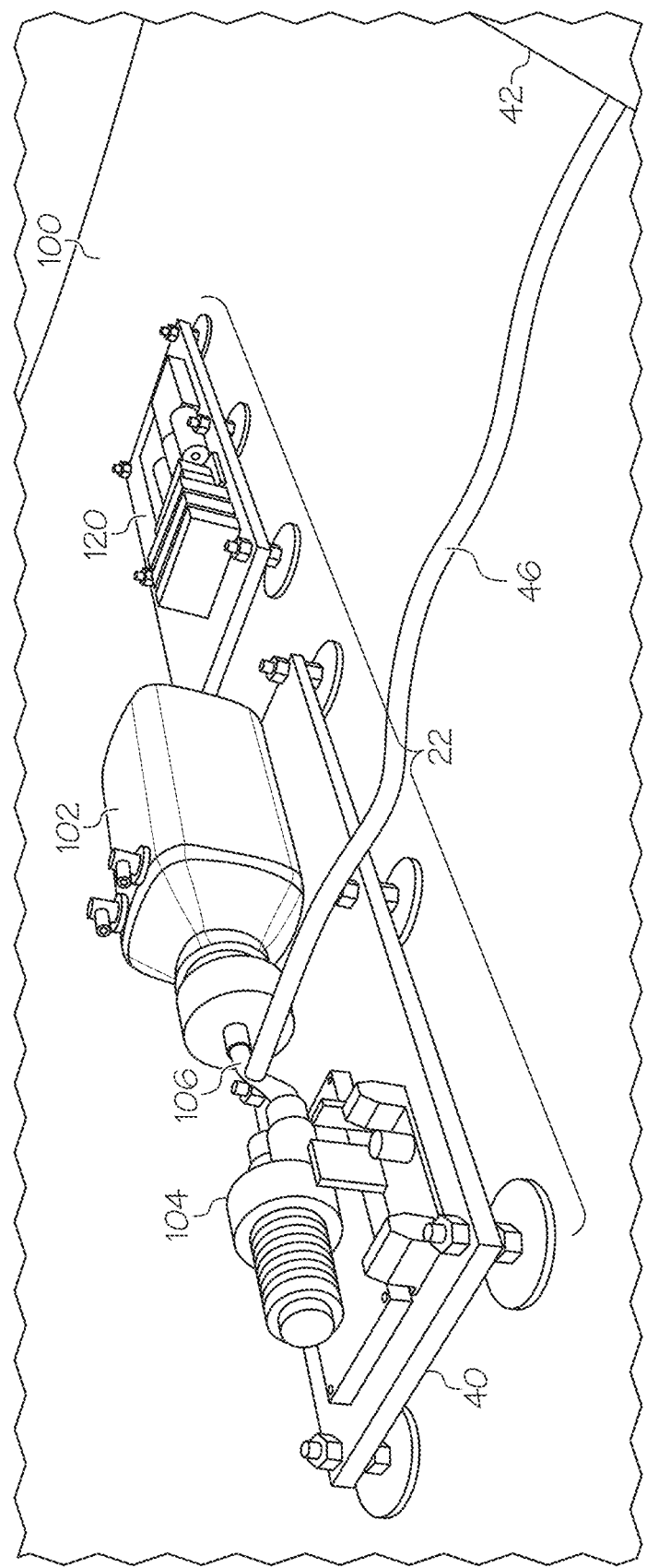
FIG. 4 is an enlarged perspective view of a portion of the system for dispensing a fluid illustrated in FIG. 3.

The fluid dispensing device 40 of the system 22 is mounted to the structure 20. The fluid dispensing device 40 has a reservoir 102 (FIG. 4). The fluid 44 is received and stored in the reservoir 102. The fluid dispensing device 40 also has a pump 104 connected to the reservoir 102 with a conduit 106. The pump 104 draws the fluid 44 from the reservoir 102 and directs the fluid 44 into and through the conduit 46. The conduit 46 directs the fluid 44 through the outlet 42. The fluid 44 is then directed from the outlet 42 onto the external surface 26 of the structure 20. A control device 120 is in communication with the pump 104 for controlling a flow rate of the fluid 44 flowing through the conduit 46. The control device 120 is in communication with the computer 86. The communication between the control device 120 and the computer 86 may be wireless or hardwired or any other suitable communication means. The communication between the computer 86 and control device 120 may also be wireless.

Thus, the system 22 satisfies a need for monitoring a flow 24 of a fluid 44 on an external surface 26 of a structure 20 in motion especially when the structure and fluid experience relatively low temperatures. The system 22 further satisfies a need to be able to observe the flow 24 of the fluid 44 on the external surface 26 of the structure 20 remotely and in real time without affecting aerodynamic characteristics of the structure during actual flight conditions. The system 22 is quick to install, is self-contained and independent of all aircraft systems. The system 22 is particularly suitable for use in certifying aircraft.

Figure 7:
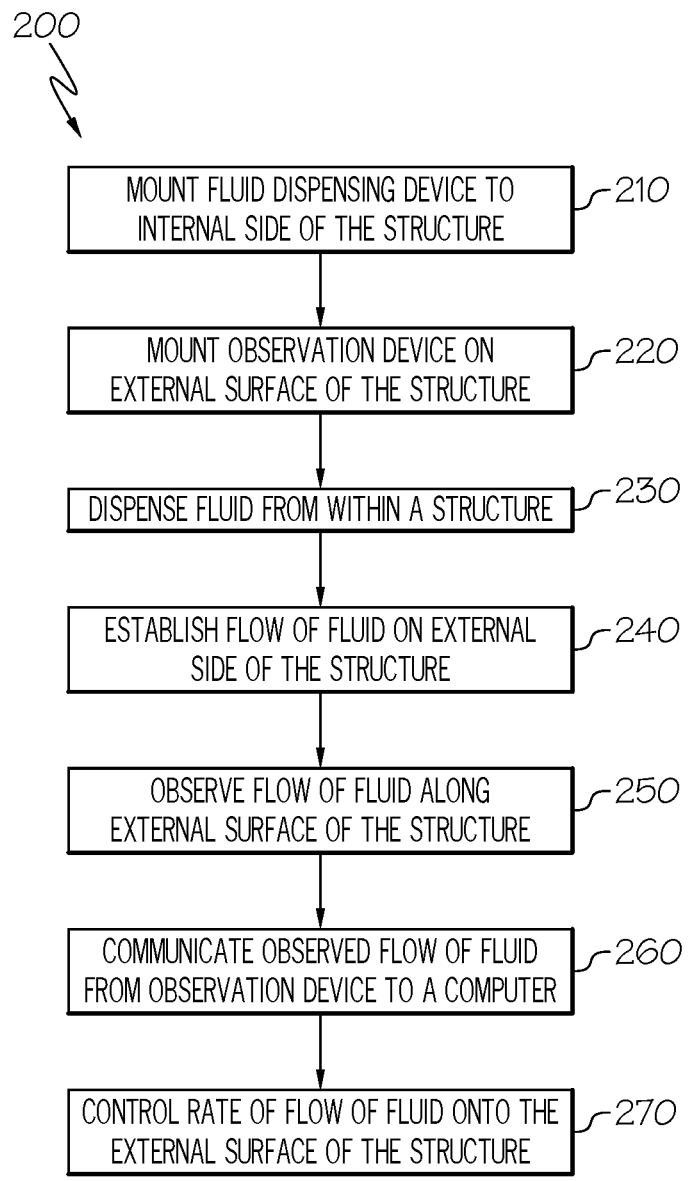
FIG. 7 is a block diagram of the steps in a method of using the system for monitoring a flow of a fluid.

Referring now to FIG. 7, shown is one example of the disclosed method, generally designated 200, for monitoring a flow 24 of a fluid 44 on an external surface 26 of a structure 20 in motion. The method 200 may utilize the system 22 described above. The structure 20 defines an external side 32 including the external surface 26. The structure 20 also defines an internal side 34 opposed from the external side 32.

The method 200 includes the step 210 of mounting a fluid dispensing device 40 to an internal surface 100 of the internal side 34 of the structure 20. The structure 20 defines an outlet 42. The structure 20 may have any number of outlets 42 of various sizes and shapes. For example, the structure 20 may define the outlet 42 as a space located between the halves of a cowl 52 of the jet engine or a series of holes in the cowl. The outlet 42 may consist of more than one opening and may be located anywhere in the structure 20 such as the nacelle 50 or cowl 52 or a series of holes in the nacelle or cowl. In an example construction, the outlet 42 may be located proximate (at or near) a lowermost portion of the structure 20. The conduit 46 directs the fluid 44 through the outlet 42 and then onto the external surface 26 of the structure 20.

The method 200 also includes the step 230 of dispensing the fluid 44 from the fluid dispensing device 40 that is located on the internal side 34 of the structure 20. The step 230 of dispensing from the fluid dispensing device 40 establishes the flow 24 of the fluid 44 on the external surface 26 of the structure 20. The step 230 of dispensing the fluid 44 directs the fluid 44 through the outlet 42. The fluid 44 is directed onto the external surface 26 of the structure 20 through the outlet 42 to establish the flow 24 of the fluid 44 in step 230. The method 200 also includes the step 240 of establishing the flow 24 of the fluid 44 on the external surface 26 of the structure 20.

The fluid 44 may be a liquid fluid. The fluid 44 may be any suitable liquid fluid that is able to flow in a visible pattern along the external surface 26 of the structure 20 during motion of the structure at relatively high altitude and relatively high speed. The relatively high altitude and relatively high-speed subjects the fluid 44 to relatively low temperatures that could affect performance of the fluid 44. In certain examples, the fluid 44 may be an oil-based liquid fluid or a glycol-based liquid fluid. The fluid 44 may include a dye or other suitable additive to make the flow 24 of the fluid 44 more visible or enable a desired flow of the fluid. The fluid 44 may have a viscosity property so the fluid is capable of flowing at relatively low temperatures from the high altitude and the high-speed motion of the structure 20.

The method 200 further includes the step 220 of mounting an observation device 60 on the external surface 26 of the structure 20. The method 200 then also includes the step 250 of observing the flow 24 of the fluid 44 along the external surface 26 of the structure 20. The step 250 of observing is done with the observation device 60 located on the external surface 26 of the structure 20. The observation device 60 comprises a camera 80. Additionally, another camera 88 may be mounted to an internal surface 100 (FIGS. 3-4) of the structure 20. The camera 88 on the internal surface 100 of the structure 20 may be used to observe if there are any leaks from jet engine fluids, such as fuel or lubricating oil, or other fluids from within the cowl 52 or nacelle 50 that may not leak externally and may collect in the cowl or other parts of the nacelle or aircraft 30.

A computer 86 (FIG. 3) is in communication with the observation device 60 and the fluid dispensing device 40. The communication between the computer 86 and the observation device 60 may be hardwired or wireless or any other suitable communication means. The method 200 also includes the step 260 of communicating the observed flow 24 of the fluid 44 from the observation device 60 to the computer 86 in real time and/or remotely. Also, the camera 88 may be in communication either wirelessly or hardwired or any other suitable communication means to the computer 86. At least one of the communications between the computer 86 and the observation device 60 and the communication between the computer 86 and the fluid dispensing device 40 is wireless. The devices in step 230 of dispensing and in step 250 of observing may run autonomously and asynchronously to gather image data for later processing by the computer 86. The method 200 further includes the step 270 of controlling a rate of flow 24 of the fluid 44 being directed onto the external surface 26 of the structure 20 with a control device 120. The control device 120 may be in communication either wirelessly or hardwired or any other suitable communication means to the computer 86. The step 260 of communicating the observed flow 24 of the fluid 44 from the observation device 60 to the computer 86 may include acquiring data from the step 250 of observing onto a removable memory device and reading the data with the computer 86. The step 270 of controlling a rate of flow 24 of the fluid 44 may be programed into the control device 120 during any time that the method 200 is used.

Thus, the method 200 satisfies a need for monitoring a flow 24 of a fluid 44 on an external surface 26 of a structure 20 in motion especially when the structure and fluid experience relatively low temperatures. The method 200 further satisfies a need to be able to observe the flow 24 of the fluid 44 on the external surface 26 of the structure 20 remotely and in real time without affecting aerodynamic characteristics of the structure during actual flight conditions. The method 200 is quick to install, is self-contained and independent of all aircraft systems. The method 200 is particularly suitable for use in certifying aircraft.

Examples may be described in the context of aircraft manufacturing and service of an aircraft or a component of the aircraft. Although an aircraft example is shown, the principles of the disclosed system 22 for monitoring a flow of a fluid and method 200 for using the system 22 may be applied to other industries, such as the automotive industry.

Although various examples of the disclosed systems and methods for monitoring a flow of a fluid on an external surface of a structure in motion have been shown and described, modifications may occur to those skilled in the art upon reading the specification. The present disclosure is intended to include such modifications and is limited only by the scope of the claims.

What is claimed is:

1. A system for monitoring a flow of a fluid on an external surface of a structure in motion, the system comprising:
   a fluid dispensing assembly configured for mounting to an internal surface of the structure, the fluid dispensing assembly comprising:
   a reservoir configured to store the fluid;
   a pump in fluid communication with the reservoir and configured to draw the fluid from the reservoir;
   a conduit extending from the pump and configured to direct the fluid onto the external surface of the structure; and
   a control device in communication with the pump and configured to regulate a flow rate of the fluid through the conduit;
   a fixture configured to removably attach the fluid dispensing assembly to the internal surface; and
   a camera configured for removably mounting to the external surface of the structure; and
   a memory device configured to store image data captured by the camera.

2. The system of claim 1, wherein the conduit is configured to direct the fluid through an outlet in the structure and onto the external surface.

3. An aircraft comprising:
   an aircraft structure defining an internal surface of the aircraft and an external surface of the aircraft;

a fluid dispensing assembly mounted to the internal surface of the aircraft, the fluid dispensing assembly comprising:
  a reservoir configured to store a fluid;
  a pump in fluid communication with the reservoir and configured to draw the fluid from the reservoir;
  a conduit extending from the pump and configured to direct the fluid through an outlet in the aircraft structure and onto the external surface of the aircraft; and
  a control device in communication with the pump and configured to regulate a flow rate of the fluid through the conduit;
a fixture removably attaching the fluid dispensing assembly to the internal surface of the aircraft;
a camera mounted to the external surface of the aircraft and positioned to capture image data of the fluid flow on the external surface; and
a memory device configured to store image data captured by the camera.

4. The aircraft of claim 3, wherein the conduit directs the fluid onto the external surface of the aircraft proximate a lowermost portion of the aircraft structure.

5. The aircraft of claim 3, wherein the fluid dispensing assembly is self-contained and independent of aircraft systems.

6. The aircraft of claim 3, further comprising a second camera mounted to the internal surface of the aircraft and positioned to capture image data of the internal surface.

7. The aircraft of claim 3, wherein the fluid comprises at least one of an oil-based fluid and a glycol-based fluid.

8. The aircraft of claim 3, wherein the fluid has a viscosity property such that the fluid is capable of flowing at a temperature below −40° F.

9. The aircraft of claim 3, wherein the camera comprises a camera lens that has a hydrophobic coating.

10. The aircraft of claim 3, wherein the memory device is a removable storage device.

11. The aircraft of claim 3, wherein the camera is a digital camera.

12. The aircraft of claim 3, further comprising a computer in wireless communication with the control device.

13. The aircraft of claim 3, wherein the control device is programmed to regulate the flow rate of the fluid based on predetermined flight conditions.

14. The aircraft of claim 3, wherein the conduit directs the fluid onto the external surface of the aircraft through a pre-existing drain hole in the aircraft structure.

15. The aircraft of claim 3, wherein the camera is supported by an aerodynamic mounting structure to minimize aerodynamic disturbance.

16. The aircraft of claim 3, wherein the memory device is configured to store real-time image data captured during flight.

17. The aircraft of claim 3, wherein the fluid dispensing assembly is mounted within an engine nacelle of the aircraft.

18. The aircraft of claim 3, wherein the fluid dispensing assembly directs the fluid onto the external surface of a nacelle or cowl of a jet engine.

19. The aircraft of claim 18, wherein the conduit directs the fluid onto the external surface of the nacelle or cowl of the jet engine.

20. The aircraft of claim 3, wherein the communication between the control device and the camera is wireless.

21. The aircraft of claim 3, wherein the system is configured to allow remote observation of the fluid flow in real time during flight.

22. A method of operating the aircraft of claim 3, the method comprising:
  dispensing the fluid from the fluid dispensing assembly through the conduit and onto the external surface of the aircraft while the aircraft is in motion;
  capturing image data of the fluid flow using the camera mounted to the external surface;
  storing the captured image data in the memory device; and
  regulating the flow rate of the fluid using the control device based on predetermined conditions.

\* \* \* \* \*